(12) United States Patent
Park

(10) Patent No.: US 8,256,541 B2
(45) Date of Patent: Sep. 4, 2012

(54) TRANSFERRING DEVICE USING AERO-LEVITATION STYLE

(75) Inventor: Kyeong Mann Park, Gyeongsangbuk-do (KR)

(73) Assignee: Posco, Pohang-Si (KR)

( * ) Notice: Subject to any disclaimer, the term of this patent is extended or adjusted under 35 U.S.C. 154(b) by 166 days.

(21) Appl. No.: 12/597,274

(22) PCT Filed: Apr. 23, 2008

(86) PCT No.: PCT/KR2008/002307
§ 371 (c)(1),
(2), (4) Date: Apr. 16, 2010

(87) PCT Pub. No.: WO2008/130193
PCT Pub. Date: Oct. 30, 2008

(65) Prior Publication Data
US 2010/0200321 A1    Aug. 12, 2010

(30) Foreign Application Priority Data

Apr. 24, 2007   (KR) .................. 10-2007-0039744

(51) Int. Cl.
*B62D 55/065* (2006.01)
(52) U.S. Cl. ............... 180/9.22; 180/9.23; 180/125
(58) Field of Classification Search ............ 180/125, 180/19.1, 9.22, 9.23; 305/34; 254/93 HP
See application file for complete search history.

(56) References Cited

U.S. PATENT DOCUMENTS

| | | | |
|---|---|---|---|
| 3,592,285 A * | 7/1971 | Noble | 180/124 |
| 3,950,038 A * | 4/1976 | Wood | 305/34 |
| 4,470,578 A * | 9/1984 | Arvidsson et al. | 254/2 C |
| 4,567,957 A * | 2/1986 | Johnson | 180/124 |
| 4,865,141 A * | 9/1989 | Gey | 180/9.26 |
| 5,349,841 A | 9/1994 | Honma et al. | |
| 5,632,538 A | 5/1997 | Wiesner et al. | |

FOREIGN PATENT DOCUMENTS

| | | |
|---|---|---|
| JP | 11-139519 | 5/1999 |
| JP | 2004-26101 | 1/2004 |
| KR | 1995-0011432 | 10/1995 |
| KR | 10-275406 | 12/2000 |
| KR | 2003-0026019 | 3/2003 |

OTHER PUBLICATIONS

Extended European Search Report for European Patent Application No. 08 74 1541 (Publication No. 2146883) dated Feb. 10, 2011, 5 pages.
International Search Report for PCT/KR2008/002307, dated Aug. 19, 2008.
First Office Action, mailed Apr. 28, 2012, from the State Intellectual Property Office of the People's Republic of China, in counterpart Chinese Patent Application No. 200880013723.8, and English translation thereof (8 pages).

\* cited by examiner

*Primary Examiner* — Tony Winner
(74) *Attorney, Agent, or Firm* — Finnegan, Henderson, Farabow, Garrett & Dunner, L.L.P.

(57) ABSTRACT

A transferring system using aero-levitation style and a transferring device using aero-levitation style are provided. The transferring device using aero-levitation style includes one or more pairs of caterpillars each of which moves while drawing a track; a plurality of air bearings disposed inside of the caterpillars and levitated from an inner bottom surfaces of the caterpillars by repulsive force of air; and a loading unit coupled to the air bearings onto which a portage is loaded, wherein the loading unit is levitated and moved together with the caterpillars by the movement of the caterpillars.

14 Claims, 6 Drawing Sheets

[Fig. 1]
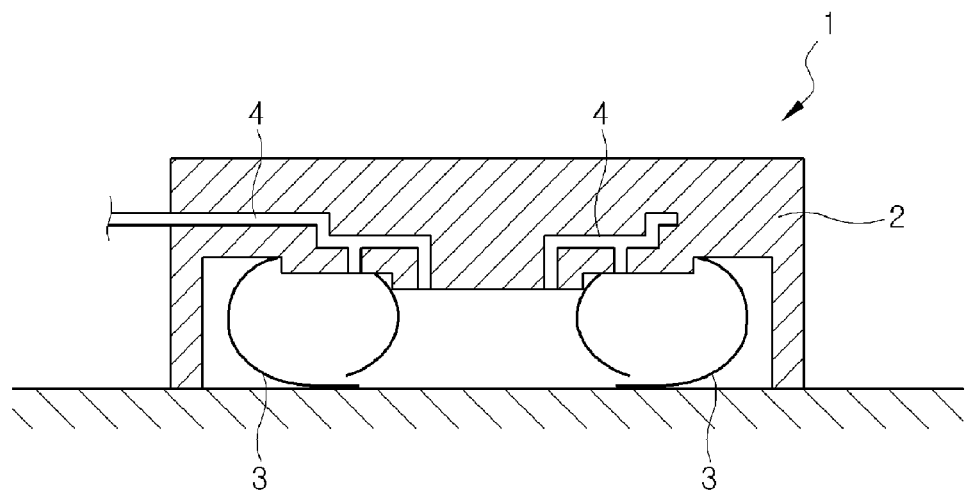
[Fig. 2]
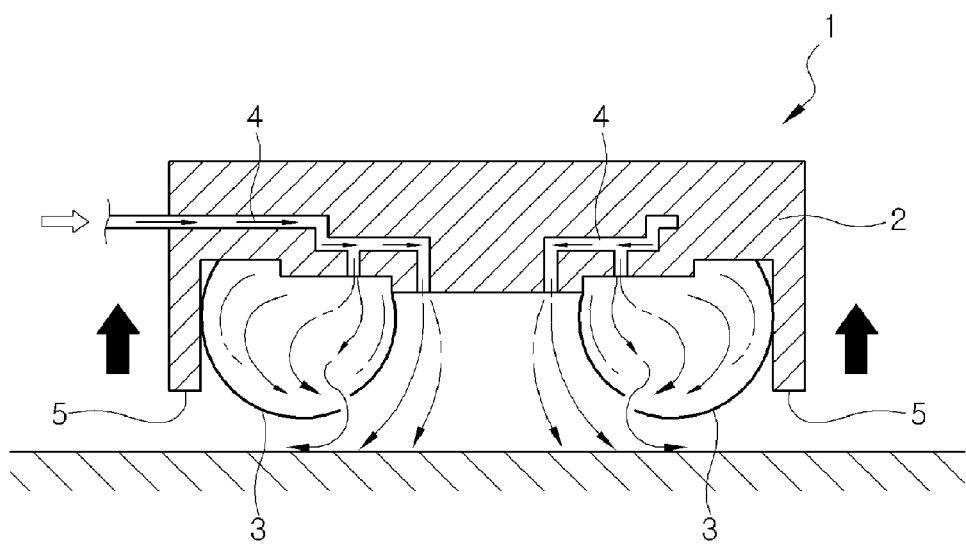

[Fig. 3]
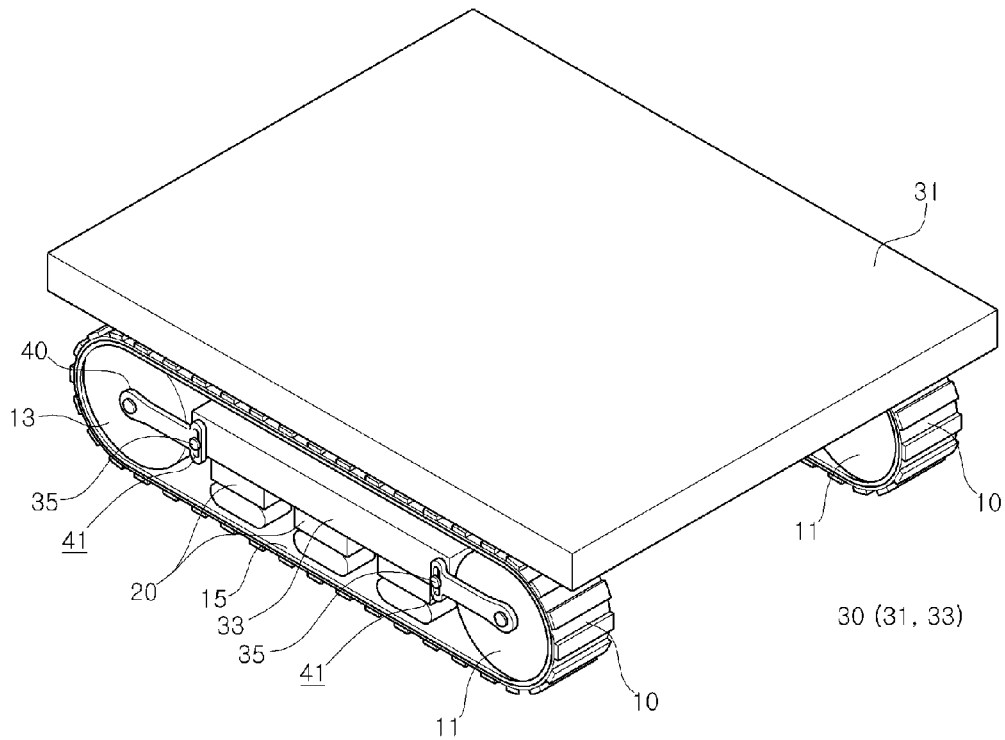
[Fig. 4]
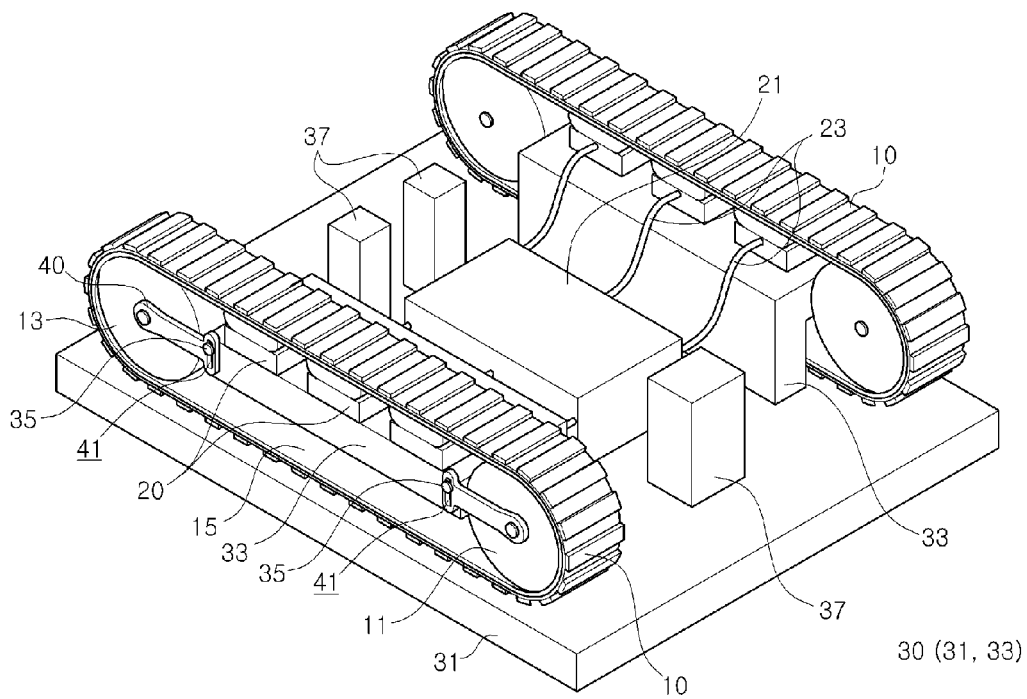

[Fig. 5]
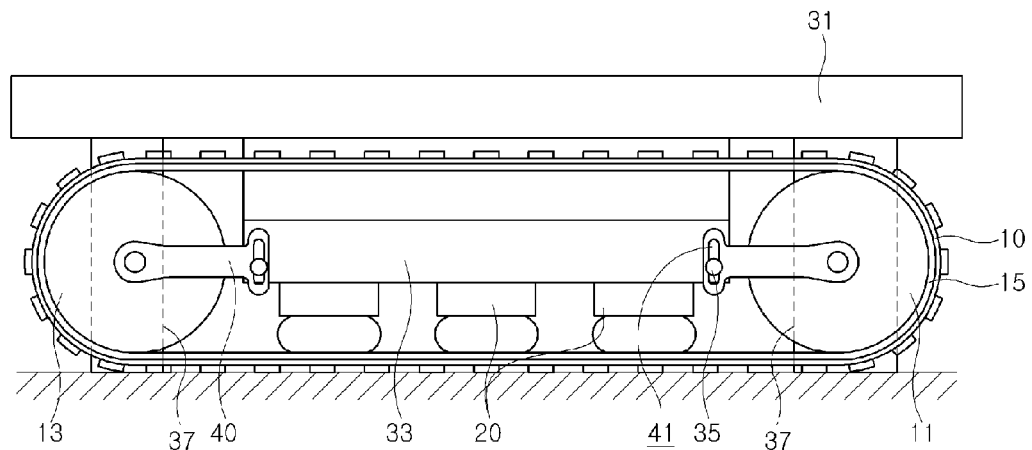
[Fig. 6]
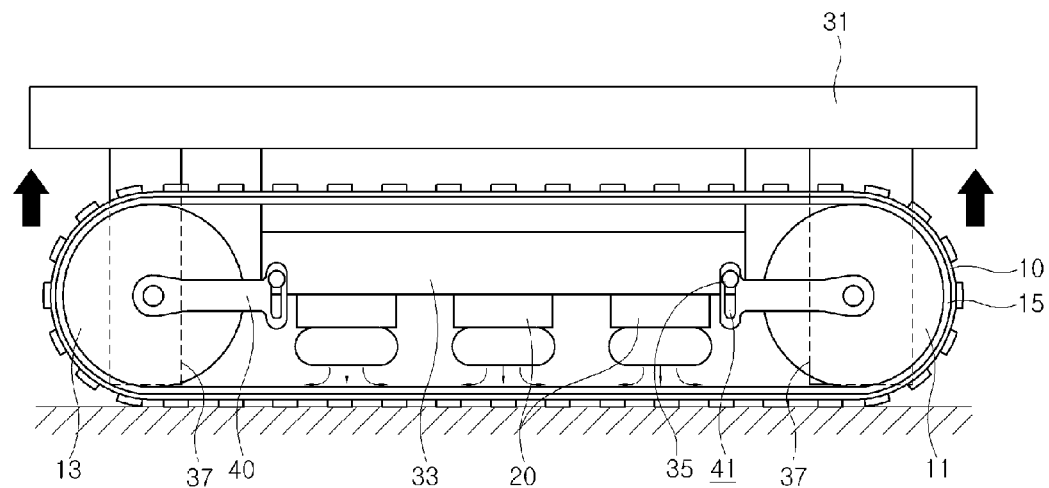

[Fig. 7]
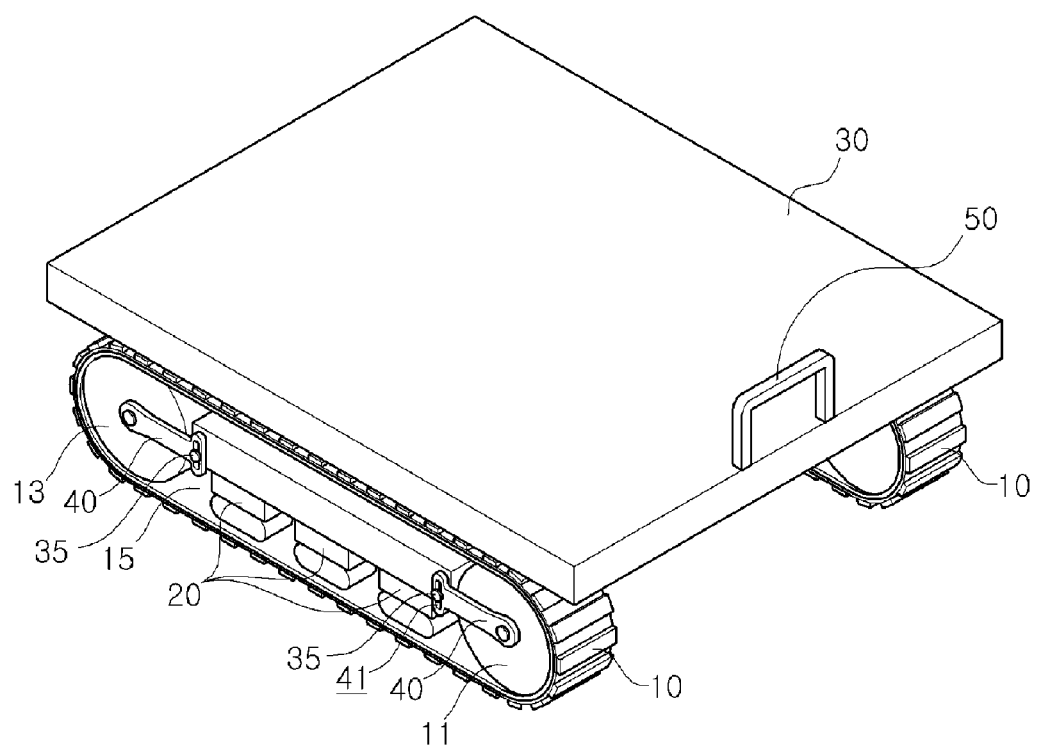

[Fig. 8]
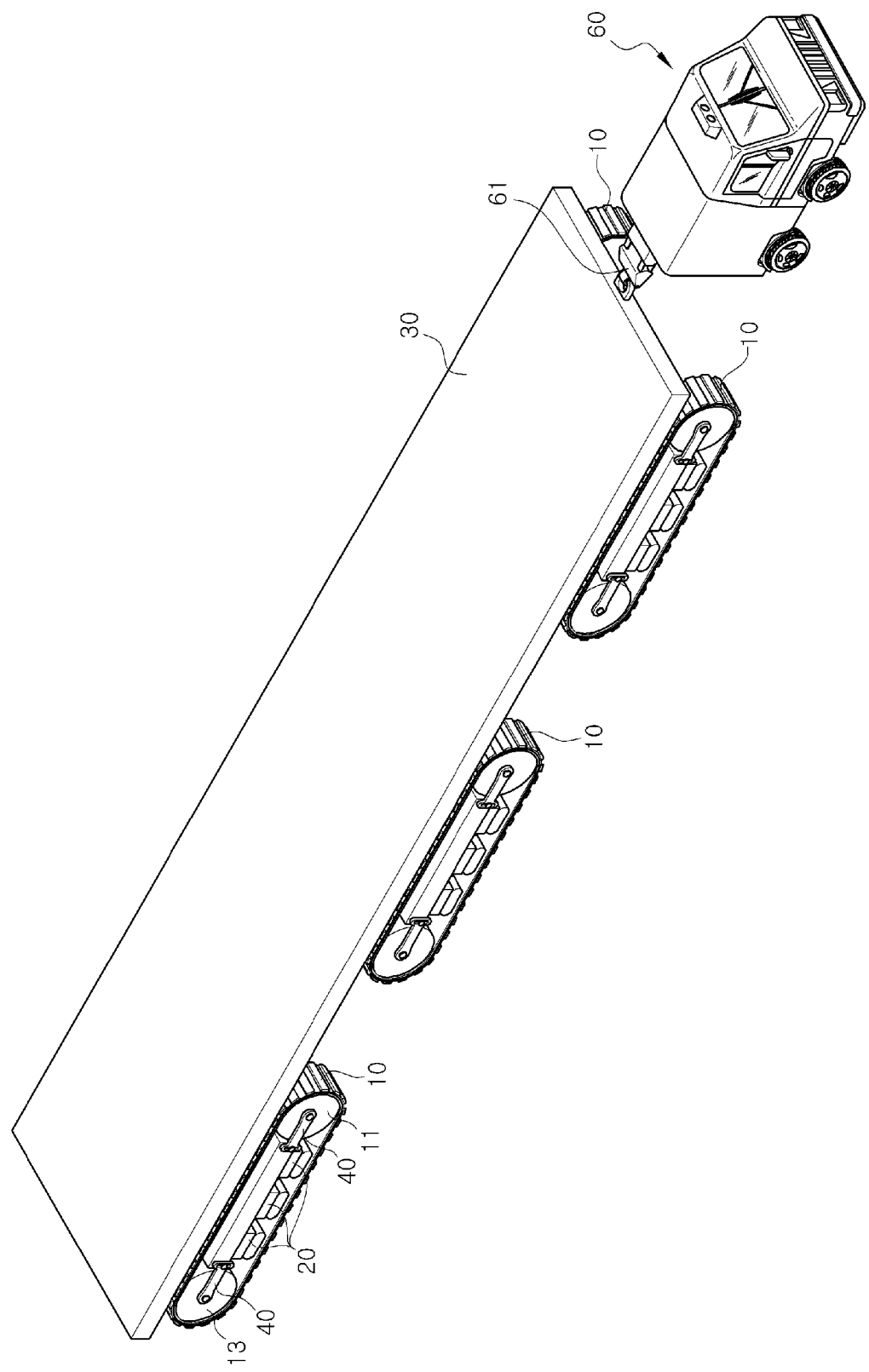

[Fig. 9]
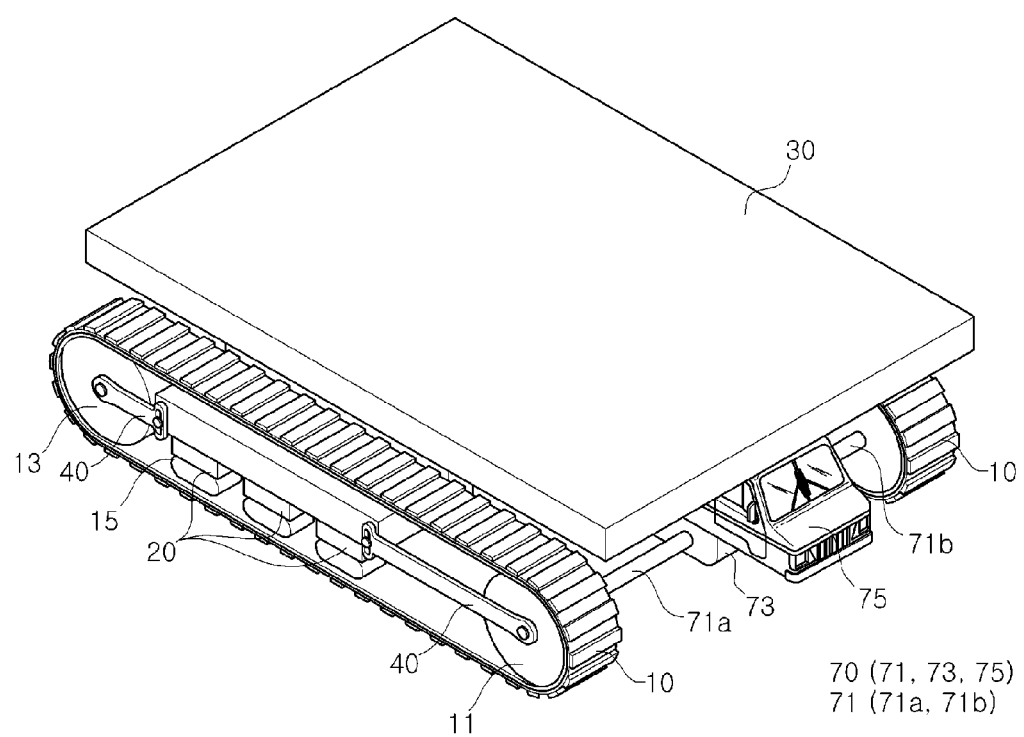

TRANSFERRING DEVICE USING AERO-LEVITATION STYLE

TECHNICAL FIELD

The present invention relates to a transferring system using aero-levitation style and a transferring device using aero-levitation style, and more particularly, to an aero-levitation transport system, which can be moved without limitation of a route even with a small force by minimizing a friction force generated by weight of a portage using endless tracks which can be moved without limitation of a route and air bearings which levitate an object with a repulsive force of compressed air, and an aero-levitation transport device using the same.

BACKGROUND ART

In general, the transportation of portage in a factory or a warehouse is achieved by a crane or transport vehicle. However, the transportation of portage using the crane has the problems in that a range within which the portage can be transported and the weight of the portage are restricted. In the transportation of portage using the transport vehicle, the range within which the portage can be transported and the limitation for weight of the portage are broader as compared with the transportation of portage using the crane, but the transportation of portage using the transport vehicle is disadvantageous in that as a vertical load of the portage is increased, the friction force is increased to thereby require large power for transporting the portage and tires and a road may be damaged due to the load concentrated to the tires of the transport vehicle.

Accordingly, in recent, a method in which air foil is formed on the ground or rails using compressed air to transport a portage has been proposed and utilized. However, such a method has a problem in that an expected place to which the portage is transported should be paved with special paint for making the ground flat or additional rails should be provided. In addition, when the ground or the rails are not flat, air locally leaks thereby not obtaining a levitation effect. Accordingly, there is a problem in that the transporting means and the portage fall to be damaged.

DISCLOSURE OF INVENTION

Technical Problem

The present invention is conceived to solve the aforementioned problems in the prior art. An object of the present invention is to provide an aero-levitation transport system which can be moved without limitation of a route with a minimizing friction force generated by weight of a portage using repulsive force of compressed air even if the ground is not paved evenly or no rail is provided, and an aero-levitation transport device using the same.

Technical Solution

According to an aspect of the present invention for achieving the objects, there is provided an aero-levitation transport system, which includes an endless track section which moves while drawing a track; a plurality of air bearings disposed inside of the endless track section and levitated from an inner bottom surface of the endless track section by repulsive force of air; and a loading unit coupled to the air bearings to be loaded with a portage to be transported.

At this time, the endless track section may include one or more pairs of caterpillars.

In addition, it is preferable that the inner peripheral surface of the caterpillar be flat, or a flat coating layer is formed on the inner peripheral surface of the caterpillar.

At this time, the coating layer is preferably formed of epoxy or urethane.

In addition, front and rear wheels for maintaining tension of the caterpillar may be respectively disposed at front and rear portions inside of the caterpillar.

Further, the loading unit may be connected to the front and rear wheels through connecting shafts, whereby the loading unit is moved together with the caterpillar.

Moreover, the aero-levitation transport system may further include an air control unit for generating and controlling high-pressure compressed air to be supplied to the air bearings.

In the meantime, according to another aspect of the present invention, there is provided an aero-levitation transport device, which includes one or more pairs of caterpillars, each moving while drawing a track; a plurality of air bearings disposed above inside of the caterpillars and levitated from the an inner bottom surfaces of the caterpillars by repulsive force of air; and a loading unit coupled to the air bearings to be loaded with a portage to be transported, wherein the loading unit is levitated and moved together with the caterpillars by the movement of the caterpillars.

At this time, front and rear wheels for maintaining tension of the caterpillars may be respectively disposed at front and rear portions inside of the caterpillars, and the loading unit may be connected to the front and rear wheels through connecting shafts.

In addition, it is preferable that the connecting shaft have a guide slot vertically formed in a portion thereof connected with the loading unit, and the loading unit have a guide protrusion formed on a place corresponding to the guide slot and guided in the guide slot.

Further, the aero-levitation transport device may further include an air control unit for generating and controlling high-pressure compressed air to be supplied to the air bearings.

Furthermore, the aero-levitation transport device may further include a towing means for towing the loading unit, wherein the towing means may include a knob to be gripped by a worker, or the towing means comprises a selfdriven vehicle.

In addition, the aero-levitation transport device may further include a driving unit for driving the caterpillars, wherein the driving unit may drive one pair selected from the front wheels or the rear wheels mounted to the caterpillars or all the wheels.

At this time, the driving unit may include a driving shaft connected to the front wheels or the rear wheels and a power source providing power to the driving shaft, wherein the power source may include one or more motors or engines.

Further, it is preferable that the driving shaft consist of a first driving shaft and a second driving shaft connected to a selected pair of the front wheels or the rear wheels, and the first and second driving shafts be controllably driven by the power source, independently.

Advantageous Effects

According to the present invention, since air bearings for levitating a loading unit are disposed inside of caterpillars which are not restricted by a route, a heavy portage can be moved freely with a minimum force (power), so that the mobility of the heavy portage can be secured.

In addition, since the friction caused by a heavy portage is minimized using repulsive force of compressed air, the present invention has advantages in that damage of a road is prevented, a noise generated by excessive power and an energy waste can be reduced.

BRIEF DESCRIPTION OF THE DRAWINGS

FIGS. 1 and 2 are sectional views illustrating the aero-levitation principle of an air bearing;

FIG. 3 is a perspective view illustrating an aero-levitation transport system according to the present invention;

FIG. 4 is a bottom perspective view illustrating the aero-levitation transport system according to the present invention;

FIGS. 5 and 6 are sectional views illustrating the operation state of an aero-levitation transport system according to the present invention; and FIGS. 7 to 9 are perspective views showing various embodiments of aero-levitation transport devices according to the present invention.

BEST MODE FOR CARRYING OUT THE INVENTION

Hereinafter, exemplary embodiments of the present invention will be described in detail with reference to the accompanying drawings.

However, the present invention is not limited to the embodiments disclosed below but may be implemented into different forms. These embodiments are provided only for illustrative purposes and for full understanding of the scope of the present invention by those skilled in the art. Throughout the drawings, like reference numerals are used to designate like elements.

First, the principle of airlevitation of an air bearing by repulsive force of compressed air will be described with reference to the drawings.

FIGS. 1 and 2 are sectional views illustrating the aero-levitation principle of an air bearing.

As shown in FIGS. 1 and 2, an air bearing 1 includes a case 2 supporting a portage to be transported and having a landing surface 5 formed thereon to be in contact with the ground while compressed air is not supplied to torus bags 3, the torus bags 3 (bags in the shape of donuts) provided below the case 2, and pipe lines 4 for supplying compressed air to the torus bags 3.

As shown in FIG. 1, the air bearing 1 configured as above is supported on the ground by the landing surface 5 while compressed air is not supplied to the torus bags 3. That is, the landing surface 5 is in contact with the ground in a state where the torus bags 3 are relaxed.

In this state, as shown in FIG. 2, if compressed air is supplied to the torus bags 3 through the pipe lines 4, the torus bags 3 are expanded and pressure in the torus bag 3 exceeds a predetermined value. Accordingly, the compressed air is discharged through a gap between the torus bag 3 and the ground to form air foil, and the air bearing 1 is levitated from the ground by repulsive force of the compressed air.

FIG. 3 is a perspective view illustrating an aero-levitation transport system according to the present invention, FIG. 4 is a bottom perspective view illustrating the aero-levitation transport system according to the present invention, and FIGS. 5 and 6 are sectional views illustrating the operation state of an aero-levitation transport system according to the present invention.

As shown in FIGS. 3 to 6, an aero-levitation transport system according to the present invention includes endless track sections 10 each of which moves while drawing a track, a plurality of air bearings 20 disposed inside of the endless track sections 10 and levitated therefrom by repulsive force of air, and a loading unit 30 coupled to the air bearings 20 and loaded with portages to be transported.

As a moving means, one or more pairs of the endless track sections 10 are arranged to face each other and rotate to cause the aero-levitation transport system to be moved on the ground. In the present invention, a caterpillar is employed as the endless track section 10. In particular, a rubberbelt type caterpillar having a flat inner peripheral surface is preferably employed as the endless track section.

In addition, a coating layer 15 of epoxy or urethane may be further formed on the inner peripheral surface of the caterpillar 10 in order to improve flatness of the inner peripheral surface. At this time, the coating layer 15 is applied not only to the rubberbelt type caterpillar having the flat inner peripheral surface but also to a steelbelt type caterpillar manufactured by coupling general steel plates to each other, so that the inner peripheral surface of the caterpillar on which joints are formed can be made be flat.

In addition, in order to maintain tension of the caterpillar 10, front and rear wheels 11 and 13 are disposed at front and rear portions inside of each caterpillar 10, respectively.

At this time, the front and rear wheels 11 and 13 can be installed by various methods so as to maintain a certain distance between the wheels. In the present invention, the front and rear wheels 11 and 13 are connected to the loading unit 30 through connecting shafts 40, so that a distance between the front wheels 11 and the rear wheels 13 can be maintained.

A configuration of the caterpillar 10 and the wheels 11 and 13 disposed therein are a part of a well known technique, so that detailed descriptions on the configurations and functions thereof will be omitted.

In the present invention, however, in order to move the caterpillar 10, which moves i n close contact with the ground, together with the loading unit 30 levitated above the inner bottom surface of the caterpillar 10, it is preferable that both ends of the connecting shaft 40 are connected so that one end can rotate or slide at either the loading unit 30 or the front wheel 11 (or the rear wheel 13). The preferred embodiment thereof will be described later.

The air bearing 20 is a levitation means which is disposed inside of the caterpillar 10 and levitated by repulsive force of air foil formed on the inner bottom surface of the caterpillar by means of compressed air supplied thereinto. A levitation principle and configuration of the air bearing 20 are previously described, so that the detailed descriptions thereon will be omitted.

The air bearing includes a mass preload type, a magnet freeload type and a vacuum type preload, and wellknown type air bearings may be variously applied to the present invention. However, it is preferable that the vacuum preload type air bearing which can be utilized easily on a plane and has a relatively excellent accuracy be applied to the present invention.

The air bearing 20 of such a vacuum preload type is not limited to that shown in FIGS. 1 and 2. If the air foil is formed between the ground and the case 2 using compressed air to levitate the case 2 by repulsive force of compressed air, an air bearing having any configuration and operation may also be included in the present invention.

It is preferable that the plurality of air bearings 20 be disposed inside of the respective caterpillars 10 at regular intervals so that the air bearings 20 in a pair of the respective caterpillars 10 installed to face each other correspond to each other.

The loading unit 30 is a means to be levitated together with the air bearings 20 by the levitation thereof, wherein an upper portion of the loading unit is formed as a loading surface 31 in the shape of a plate in order for portages to be loaded thereon, and a lower portion of the loading unit is variously form so that the air bearings 20 are installed to the lower portion in order for the air bearings to be disposed inside of the caterpillar 10. It is illustrated in the present invention that the loading unit in which a pair of Lshaped supporting frames 33 are formed to protrude downward from the loading surface 31 and a lower end of each supporting frame is disposed inside of the caterpillar 10.

Accordingly, it is preferable that the air bearings 20 be disposed on a lower surface of each supporting frame 33 at certain intervals.

At this time, as shown in FIG. 4, an air control unit 21 is further provided at a certain point of the loading unit 30, e.g., between the pair of supporting frames 33, to generate and control high-pressure compressed air to be supplied to the air bearings 20.

The air control unit 21 is provided with a device for generating high-pressure compressed air and controlling the amount of compressed air to be discharged, wherein the device is connected to the air bearings 20 through pipe lines 23 to supply compressed air. Such a device is a part of a well known technique, so that detailed descriptions on the configurations and functions thereof will be omitted.

In addition, landing portions 37 are provided downward on the loading surface 31 of the leading unit 30 to support the overall loading unit 30 on the ground before the air bearings 20 are levitated.

The landing portions 37 perform the same function as the landing surface 5 formed on the air bearings 1 described as above, and are formed to extend downward from the loading surface 31 of the loading unit 30. It is preferable that the landing portions 37 be formed to have height such that the loading unit 30 is supported on the ground by the landing portions 37 before the air bearings 20 are levitated and the landing portions 37 are levitated from the ground after the air bearings 20 are levitated.

In addition, it is preferable that one or more of the landing portions 37 be provided to stably support the loading unit 30 on the ground.

Hereinafter, an aero-levitation transport device according to the present invention will be illustrated with reference to the drawing. In the following description, the parts similar to or substantially identical with those of the aforementioned aero-levitation transport system according to the present invention will be omitted or illustrated briefly.

FIGS. 7 to 9 are perspective views showing various embodiments of aero-levitation transport devices according to the present invention.

As shown in the figures, an aero-levitation transport device according to the present invention includes one or more pairs of caterpillars 10 each of which moves while drawing a track; a plurality of air bearings 20 disposed inside of the caterpillars 10 to be levitated from an inner bottom surfaces of the caterpillars 10 by repulsive force of air; and the loading unit 30 coupled to the air bearings 20 to be loaded with portages to be transported.

The caterpillars 10 are provided to face each other at a lower side of the loading unit 30 in one or more pairs in proportion to dimensions of the loading unit 30.

At this time, in a case where multiple pairs of the caterpillars 10 are provided, the number of the supporting frames 33 provided on the loading unit 30 corresponds to the number of the caterpillars 10.

In addition, as described above, the air control unit 21 is provided on the loading unit 30 to generate and control high-pressure compressed air to be supplied to the air bearings 20, one or more of the air control units 21 are provided corresponding to the number of the caterpillars 10.

Also, it will be preferable that the number of the landing portions 37 provided on the loading unit 30 be increased in proportion to dimensions of the loading unit 30.

In addition, the front and rear wheels 11 and 13 provided inside of the caterpillar 10 are connected to the loading unit 30 through the connecting shafts so that the loading unit 30 is levitated and moved together with the caterpillars when the caterpillars 10 are moved.

The connecting shafts 40 is a means for guiding the vertical levitation of the loading unit 30 and moving forward/rearward the loading unit 30 together with the front wheels 11 and the rear wheels 13 when the front wheels 11 and the rear wheels 13 are moved forward and rearward by the movement of the caterpillars 10. It is preferable that the connecting shafts 40 rotate about or slide on the connecting portions with the front wheels 11 and the rear wheels 13 or the loading unit 30.

According to a preferred embodiment of the present invention, the configuration, in which the connecting shafts 40 slide on the connecting portions with the front wheels 11 and the rear wheels 13 or the loading unit 30, is employed. In the one embodiment, one end of the connecting shaft 40 is connected to the front wheels 11 or the rear wheels 13 and the other end thereof is connected to a guide protrusion 35 protruding from a side surface of the loading unit 30.

At this time, a guide slot 41 is vertically formed in the other end of the connecting shaft 40 and the guide protrusion 35 is inserted into and connected to the guide slot 41 so that the guide protrusion 35 is guided upward and downward in the guide slot. Thus, in a case where the loading unit 30 is levitated and moved upward, the guide protrusion 35 slides upward along the guide slot 41.

Accordingly, the loading unit 30 can freely move upward/downward, whereas when the front wheels 11 or the rear wheels 13 are moved forward/rearward while the caterpillars 10 move, the loading unit 30 moves forward/rearward together with the wheels by being towed by the connecting shafts 40 pivotally connected to the front wheels 11 or the rear wheels 13.

Further, in order to illustrate the aero-levitation transport device according to the present invention, a method of moving the loading unit 30 using additional towing force and a method of moving the loading unit 30 using self power are exemplified herein.

First, in the method of moving the loading unit using additional towing force, as shown in FIGS. 7 and 8, there is provided a towing means for towing the loading unit 30.

In FIG. 7 showing a smallsized device for transporting smallsized portage, a knob 50 is provided on the loading unit 30, so that a worker can directly grip the knob 50 and tow and move the transport device.

In FIG. 8 showing a largesized device for transporting largesized portage, there is provided a link unit 61 for connecting the loading unit 30 with a vehicle 60 to move the transport device using towing force of the vehicle 60.

At this time, as shown in the figure, if the loading unit 30 elongates, it is preferable to provide multiple pairs of the caterpillars 10 in proportion to the elongated length of the loading unit 30.

In addition, in the method using self power, there is further provided a driving unit 70 for driving the caterpillars 10 as shown in FIG. 9.

It is desirable that the driving unit 70 drives any one pair selected from the front wheels 11 or the rear wheels mounted to the caterpillars 10 or all the wheels.

In FIG. 9 illustrating that the driving unit 70 drives the front wheels 11. As shown in the figure, the driving unit 70 includes a driving shaft 71 connected to the front wheels 11 and a power source 73 proving power to the driving shaft 71.

The driving shaft 71 consists of a first driving shaft 71a and a second driving shaft 71b which are connected to the pair of front wheels 11, respectively, wherein the first driving shaft 71a and the second driving shaft 71b are controlled by the power source 73. Accordingly, the pair of front wheels 11 are independently driven by the control of the first and second driving shafts 71a and 71b, whereby the transport device can be moved and steered when the caterpillars 10 are driven.

The power source 73 may include one or more of motors or engines. Accordingly, the first driving shaft 71a and the second driving shaft 71b are driven by the power supplied from the power source 73, independently.

In addition, there is provided a control room 75 for controlling the power source 73, so that the worker can board directly in the control room 75 to control the power source 73.

Hereinafter, an operation state of the aero-levitation transport system and the aero-levitation transport device using the same will be described as follows.

As shown in FIG. 5, before the aero-levitation transport system is moved, the landing portions 37 provided at the lower portion of the loading unit 30 are supported on the ground to maintain a state in which the loading unit 30 is stably supported.

Then, when the loading unit 30 is levitated as shown in FIG. 6, high-pressure compressed air is supplied to the air bearings 20 by the control of the air control unit 21, so that air foil is formed between the inner bottom surface of each caterpillar 10 and the air bearings 20 and the loading unit 30 is levitated by repulsive force of the air foil.

At this time, the loading unit 30 is guided and levitated by the connecting shaft 40 connecting the loading unit 30 and the front wheel 11. Specifically, during the levitation of the loading unit 30, the guide protrusion 35 formed to protrude on the side surface of the loading unit 30 is guided along the guide slot 41 formed on the connecting shaft 40.

Then, if the caterpillars 10 are moved forward, the loading unit 30 is moved forward together with the caterpillars 10 by the towing of the connecting shaft 40 in a state where the loading unit 30 is levitated above the inner bottom surfaces of the caterpillars and the friction is minimized.

At this time, since the amount of force P required to transport the portage is in proportion to a friction coefficient μ and a weight W of the portage (that is, P=μW), if a weight W of the portage is constant, the required force is in proportion to a friction coefficient μ.

Accordingly, if a friction coefficient μ is reduced to a minimum value, about 0.01, by the aero-levitation according to the present invention, it is possible to transport the loading unit 30 with small force.

In addition, since the loading unit 30 is connected to the front wheels 11 and the rear wheels 13 through the connecting shafts 40 and is towed by the connecting shafts 40 to be moved together with the caterpillars according to the movement of the caterpillars 10, the air bearings 20 provided on the loading unit 30 are always placed above the inner bottom surface of the caterpillar 10, so that the loading unit 30 can be levitated stably without the limitation of space.

As described above, if the loading unit 30 and the caterpillars 10 are moved in a state where the loading unit 30 is levitated above the inner bottom surfaces of the caterpillars 10 by the air bearings 20, the portage can be transported with small force. Thus, a work can directly grip the knob 50 to move the transport device as shown in FIG. 7, and the transport device can be moved by the additional towing vehicle 60 as shown in FIG. 8.

In addition, as shown in FIG. 9, the transport device is provided with the driving source 70 so that the transport device is driven by itself, and the driving source independently controls forward and rearward movements of the caterpillars 10 facing each other, whereby the transport device can be moved forward/rearward and steered.

The invention claimed is:

1. A transferring system using aero-levitation device, comprising:
   an endless track section which moves while drawing a track;
   a plurality of air bearings disposed inside of the endless track section and levitated from an inner bottom surface of the endless track section by repulsive force of air; and
   a loading unit coupled to the air bearings onto which a portage is loaded, wherein
   front and rear wheels for maintaining tension of the endless track section are respectively disposed at front and rear portions inside of the endless track section,
   the loading unit is connected to the front and rear wheels through connecting shafts,
   and the connecting shaft comprises a guide slot which is vertically formed in a portion where the connecting shaft is connected with the loading unit, and the loading unit comprises a guide protrusion which is formed on a position corresponding to the guide slot and guided in the guide slot.

2. The transferring system using aero-levitation device as claimed in claim 1, wherein the endless track section comprises one or more pairs of caterpillars.

3. The transferring system using aero-levitation device as claimed in claim 2, wherein an inner peripheral surface of the caterpillar is flat.

4. The transferring system using aero-levitation device as claimed in claim 2, wherein a flat coating layer is formed on an inner peripheral surface of the caterpillar.

5. The transferring system using aero-levitation device as claimed in claim 4, wherein the coating layer is formed of epoxy or urethane.

6. The transferring system using aero-levitation device as claimed in claim 1, further comprising an air control unit for generating and controlling high pressure compressed air which is supplied to the air bearings.

7. The transferring system using aero-levitation device as claimed in claim 2, further comprising a towing means for towing the loading unit.

8. The transferring system using aero-levitation device as claimed in claim 7, wherein the towing means comprises a knob to be gripped by a worker.

9. The transferring system using aero-levitation device as claimed in claim 7, wherein the towing means comprises a self-driven vehicle.

10. The transferring system using aero-levitation device as claimed in claim 2, further comprising a driving unit for driving the caterpillars.

11. The transferring system using aero-levitation device as claimed in claim 10, wherein the driving unit drives a selected pair of the front wheels or the rear wheels mounted to the caterpillars, or all the wheels.

12. The transferring system using aero-levitation device as claimed in claim 11, wherein the driving unit comprises a driving shaft connected to the front wheels or the rear wheels and a power source providing power to the driving shaft.

13. The transferring system using aero-levitation device as claimed in claim 12, wherein the power source comprises one or more motors or engines.

14. The transferring system using aero-levitation device as claimed in claim 12, wherein the driving shaft comprises a first driving shaft and a second driving shaft connected to a selected pair of the front wheels or the rear wheels, and the first and second driving shafts are controllably driven by the power source, independently.

* * * * *